United States Patent [19]

Rosenquist et al.

[11] Patent Number: 5,064,914
[45] Date of Patent: Nov. 12, 1991

[54] METHOD OF BRANCHING POLYESTERS

[75] Inventors: Niles R. Rosenquist, Evansville; Edgar E. Bostick, Mt. Vernon, both of Ind.

[73] Assignee: General Electric Company, Mt. Vernon, Ind.

[21] Appl. No.: 447,492

[22] Filed: Dec. 7, 1989

[51] Int. Cl.$^5$ ........................ C08L 67/02; C08G 63/91
[52] U.S. Cl. ..................................... 525/439; 525/444
[58] Field of Search ................................ 525/439, 444

[56] References Cited

U.S. PATENT DOCUMENTS 4,132,707 1/1979 Borman ............................... 525/444
4,826,928 5/1989 Rosenquist ........................... 525/439

Primary Examiner—Patricia Short
Attorney, Agent, or Firm—Martin B. Barancik; Joseph T. Eisele

[57] ABSTRACT

Linear polyester are branched by transesterification with resins having repeating or recurring polymer chain units of the formula:

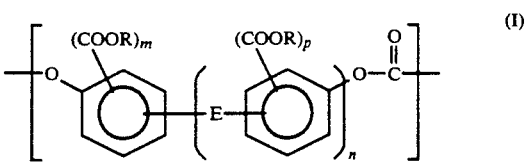

wherein m, n and p are each independent integers of 0 or 1; R represents hydrocarbyl; and E represents alkylene containing from 1 to 15 carbon atoms, inclusive, halogen- substituted alkylene of 1 to 15 carbon atoms, inclusive, alkylene of 1 to 15 carbon atoms, inclusive, substituted with a —COOR group where R is as previously defined, or alkylene having 1 to 15 carbon atoms substituted with a monovalent group of the formula:

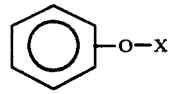

wherein X represents one of hydrogen, hydrocarbyl or

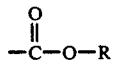

wherein R is as defined above; provided there is at least one moiety present, containing an R group.

9 Claims, No Drawings

METHOD OF BRANCHING POLYESTERS

BACKGROUND OF THE INVENTION

1. Field of the Invention

The invention relates to polyester resins and more particularly to a method of branching linear polyester resins.

2. Brief Description of the Prior Art

Linear polyesters such as, for example, poly (ethylene terephthalate) (referred to hereafter at times as "PET") and poly (1,4-butylene terephthalate) (referred to hereafter at times as "PBT") are widely known and used to fabricate a variety of thermoplastic articles; see for example U.S. Pat. No. 4,684,686. Many of their properties, including chemical stability and solvent resistance make them attractive candidates for such forming operations as blow molding, profile extrusion and thermoforming. One problem in such operations is the relatively low melt viscosities of the polyesters, as a result of which the formed articles do not always adequately retain their shape immediately after forming and before they have cooled.

One method of increasing the melt viscosity of a linear polyester, described in U.S. Pat. No. 4,590,259, is to substantially increase its molecular weight. This is possible (though often difficult, owing to the crystallinity of the polyester) if the polyester has a low proportion of carboxylic acid end groups. However, many polyesters currently available have a relatively high proportion of such groups, which makes molecular weight increase impractical as a means of increasing melt viscosity. In any event, specialized equipment is usually required to increase a polyester's molecular weight.

Even if the polyester molecular weight is high, melt behavior often leaves something to be desired since it is essentially independent of shearing stresses imposed during forming. In the best situation, a resin suitable for blow molding, profile extrusion, thermoforming and the like will exhibit a non-Newtonian response, having a low viscosity under high shear conditions such as those encountered during extrusion and a high viscosity under conditions of low shear typical of a blow molded parison or a thermoformed article. High molecular weight polyesters under melt conditions have the disadvantage of being essentially Newtonian in their behavior.

The present invention achieves thermomolding compositions exhibiting higher melt strengths by a branching of the polyester, which can take place during the forming process, for example during extrusion.

An advantage of the present invention it that it does not require specially designed facilities for polyester production. Conventional processing equipment may be employed for the branching of conventional polyesters such as PET, PBT and like elastomeric polyesters.

SUMMARY OF THE INVENTION

The invention comprises a process for branching a thermoplastic, linear, polyester resin, which comprises; providing the resin;
homogeneously mixing with the resin, a branching proportion of a thermoplastic, polymeric, branching resin having recurring polymer chain units selected from those of the formula:

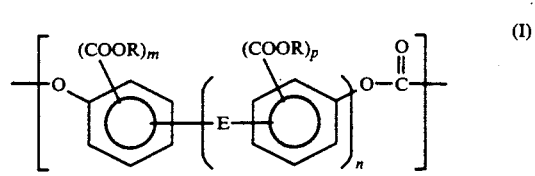

wherein m, n and p are each independently integers of 0 or 1; R represents hydrocarbyl; and E represents alkylene containing from 1 to 15 carbon atoms, inclusive, halogen—substituted alkylene of 1 to 15 carbon atoms, inclusive, alkylene of 1 to 15 carbon atoms, inclusive, substituted with a—COOR group where R is as previously defined, or alkylene having 1 to 15 carbon atoms substituted with a monovalent group of the formula:

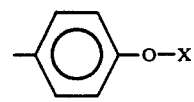

wherein X represents one of hydrogen, hydrocarbyl or

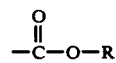

wherein R is as defined above;
provided there is at least one moiety present, containing an R group; and
effecting a branching reaction between the linear polyester resin and the branching resin.

The term "hydrocarbyl" as used herein means the monovalent moiety obtained upon removal of a hydrogen atom from a parent hydrocarbon. Representative of aliphatic hydrocarbyl are alkyl of 1 to 15 carbon atoms, inclusive such as methyl, ethyl, propyl, butyl, pentyl, hexyl, heptyl, octyl, nonyl, decyl, undecyl, dodecyl, tridecyl, tetradecyl, pentadecyl and isomers thereof; cycloalkyl of 3 to 8 carbon atoms, inclusive, such as cyclopropyl, cyclobutyl, cyclopentyl, cyclohexyl, cycloheptyl, cyclooctyl; alkyl substituted cycloalkyl of 4 to 15 carbon atoms, inclusive, such as 2-methylcyclopropyl, 3,4-dimethylcyclohexyl; alkenyl of 2 to 15 carbon atoms, inclusive, such as allyl, 3-hexenyl, 2,4-pentadienyl; aryl and aralkyl of 7 to 15 carbon atoms, inclusive, such as benzyl, phenethyl, phenpropyl, phenbutyl, phenoctyl and the like.

The term "halogen" is used throughout the specification and claims in its normally accepted sense as embracive of chlorine, bromine, iodine and fluorine.

The term "alkylene" as used herein means the divalent moiety obtained upon removal of two hydrogen atoms from a parent hydrocarbon. Representative of alkylene are methylene, propylene, butylene, decylene, tetradecylene, pentadecylene and isomeric forms thereof.

The invention also comprises novel polyester branching resins, useful in the method of the invention and branched linear polyester resins prepared by the method of the invention.

The branched polyester products of the method of the invention are characterized-in-part by an enhanced melt strength and melt elasticity. Other advantageous physical properties will be described below. The branched polyesters of the invention are useful in applications such as profile extrusion (for example of wire and cable insulation, extruded bars, pipes, fiber optic buffer tubes, and sheets); blowmolding (for example of containers and cans, gas tanks, automotive exterior applications such as bumpers, aerodams, spoilers and ground effects packages); and thermoforming (for example of automotive exterior applications and food packaging).

DETAILED DESCRIPTION OF THE PREFERRED EMBODIMENTS OF THE INVENTION

The linear polyesters advantageneously crosslinked according to the process of the invention are well known synthetic polymers as are the methods of their preparation. Many of these polyesters are commercially available. Representative of the linear polyesters used in the process of the invention are those having repeating chain units of the formula:

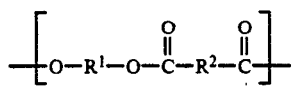
(II)

wherein each of $R^1$ and $R^2$ is a divalent aliphatic, alicyclic or aromatic radical containing about 2-10 carbon atoms. At least about 30 of said units are usually present with at least about 50 being preferred, most preferably at least about 100. Such linear polyesters are typically prepared by the known reaction of dihydroxy compounds with dicarboxylic acids or functional derivatives thereof such as anhydrides, acid chlorides or lower alkyl (especially methyl) esters, preferably the esters; see for example U.S. Pat. Nos. 2,465,319; 2,720,502; 2,727,881 2,822,348; 3,047,539; 3,671,487; 3,953,394; and 4,128,526, all of which are incorporated herein by reference thereto.

The $R^1$ radical may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol, 2-butene-1,4-diol, resorcinol, hydroquinone, bisphenol A and like dihydroxy compounds. They may also be radicals containing substituents which do not substantially alter the reactivity of the dihydroxy compound (e.g., alkoxy, halo, nitrile) or hetero atoms (e.g., oxygen or sulfur).

The $R^2$ radicals may be derived from such acids as succinic, adipic, isophthalic and terephthalic acids or like substituted and hetero atom-containing acids. They preferably contain about 6-10 carbon atoms, inclusive.

Preferably, $R^1$ is aliphatic and especially saturated aliphatic and $R^2$ is aromatic. The polyester is most desirably a poly(alkylene) terephthalate, particularly poly(ethylene) terephthalate or poly(1,4-butylene terephthalate) hereinafter sometimes referred to as "polybutylene terephthalate" or "PBT".

PBT, because of its very rapid crystallization from molds is uniquely useful as a component in injection moldable compositions. Accordingly, PBT branched in accordance with the present invention, particularly by blow molding technique, is particularly advantageous for the fabrication of articles when certain properties are of importance. Work pieces molded from such polyester resins, in comparison with other thermoplastics, offer a high degree of surface hardness and abrasion resistance, high gloss and low surface friction, in addition to enhanced fire resistance.

The polyesters branched by the method of the invention preferably have melt viscosities within the range of from 7,000 to 75,000 poise, measured at 250° C.

Certain of the branching resin agents employed in the process of the invention are polyesters characterized-in-part by occasional recurring chain units of the formula (I) given above. These branching agents are advantageously selected from polyesters having repeating or frequently recurring polymer chain units of the formula (II) given above, interrupted by occassional chain units of the formula (I) given above. These branching agents may be prepared by modifying the preparative procedure used to prepare the linear polyesters, which are branched by the process of the invention and already described above. The modification consists of replacing a proportion of the dihydroxy reactant conventionally used and described above with an equal equivalent proportion of a dihydroxy phenol of the formula:

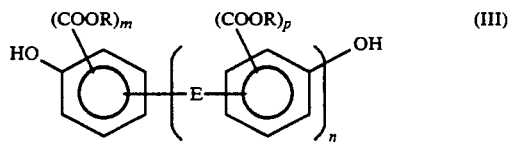
(III)

wherein R, E, m, n and p have the meanings previously ascribed to them.

Dihydroxy phenol compounds of the formula (III) are generally well know compounds as are methods of their preparation. Representative of the dihydroxy phenols of formula (III) are:

3,5-dihydroxy benzoic acid methyl, ethyl, propyl, isopropyl, butyl, isobutyl, pentyl, hexyl, cyclopentyl, cyclohexyl, heptyl, octyl, nonyl, decyl, undecyl, dodecyl, tridecyl, tetradecyl, pentadecyl and phenyl ester; the corresponding esters of 2,2-bis (4-hydroxyphenyl) butyric acid;
4,4-bis (4-hydroxyphenyl) valeric acid;
4,4-bis (3-methyl-4-hydroxyphenyl) valeric acid; and
3,3-bis (4-hydroxyphenyl) caproic acid.

Preferred phenol (III) compounds for preparing the polyester branching resin agents used in the process of the invention include those of the more specific formula:

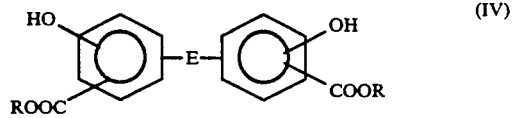
(IV)

wherein E and R are as previously defined.

The diphenol esters of the Formula (IV) are generally well known as are methods of their preparation; see for example U.S. Pat. No. 3,285,875. In general, they may also be prepared by esterifying the corresponding dihydroxy diacids, i.e.; the diphenolacids of the Formula (IV) wherein R is hydrogen, with an appropriate alcohol of the formula:

R'—OH (V)

wherein R' represents hydrocarbyl or halogen-substituted hydrocarbyl, in the presence of an esterification catalyst such as an organic acid. The esterification is advantageously carried out in the presence of an inert organic solvent for the reactants and the ester product or a large excess of the alcohol (V). The ester product is separated from the reaction mixture by conventional techniques of extraction, washing and solvent removal. Alternatively, the esters of formula (IV) may be prepared by the general method described in British Patent specification 952,591.

Alcohols of the Formula (V) given above are generally well known and include, for example, cyclohexyl alcohol, 4-tert-butyl-cyclohexyl alcohol and, preferably, methyl alcohol, isopropyl alcohol or ethyl alcohol. Also useful are the halogen-substituted hydrocarbon alcohols.

The phenol (III) compounds wherein E represents alkylene of 1 to 15 carbon atoms substituted with a monovalent group of the formula:

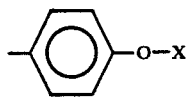

wherein X is

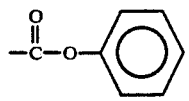

are also well known compounds as are methods of their preparation. For example, the phenol (III) compounds of the formula:

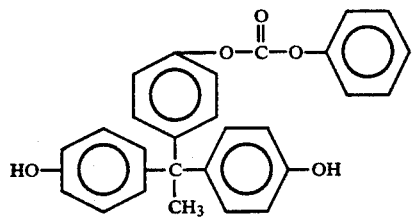

may be prepared by the reaction of the corresponding trishydroxyphenylethane with phenyl chloroformate.

The branching resins used in the process of the invention also include polycarbonate resins, i.e.; resins containing repeating or recurring polycarbonate units of the formula:

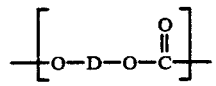

(VI)

wherein D is a divalent aromatic radical of a dihydric phenol (III) employed in the polymerization reaction, which comprises the reaction of the dihydric phenol (III) with a carbonate precursor. The reaction is well known and is described for example in the U.S. Pat. Nos. 3,028,365; 3,334,154; 3,275,601; 3,915, 926; 3,030,331; 3,169,121; and 3,027,814;

Although the reaction conditions of the preparative processes may vary, the interfacial polymerization processes typically involve dissolving or dispersing the phenol reactant in a suitable water immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene, and the like.

The catalyst employed accelerates the rate of polymerization of the dihydric phenol (III) reactant with the carbonate precursor. Representative catalysts include but are not limited to tertiary amines such as triethylamine, quaternary phosphonium compounds, quaternary ammonium compounds, and the like. The preferred process for preparing polycarbonate branching agent resins comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition and solvent reflux may be used to control the reaction temperature. The amount of phosgene required will generally depend upon the amount of the dihydric phenol (III) and the amount of any dicarboxylic acid also present.

The carbonate precursor employed in the preparation of known polycarbonate resins as well as resins having chains including the moieties of Formula (I) may be a carbonyl halide, a diarylcarbonate, or a bishaloformate. The carbonyl halides include carbonyl bromide, carbonyl chloride, and mixtures thereof. The bishaloformates include the bischloroformates of ethylene glycol, neopentylene glycol, polyethylene glycol, and the like. Typical of diarylcarbonates which may be employed are diphenyl carbonate, and the di(alkylphenyl)-carbonates such as di(tolyl) carbonate. Some other non-limiting illustrative examples of suitable diarylcarbonates include di(napthyl)carbonate, phenyl tolyl carbonate, and the like.

The preferred carbonate precursors are the carbonyl halides, with carbonyl chloride, also known as phosgene, being the preferred carbonyl halide.

In the preparation of embodiment polycarbonate branching resins used in the process of the invention, a portion of the dihydroxy phenol (III) reactant is replaced with an equivalent proportion of a second dihydric phenol, represented by those of the formula:

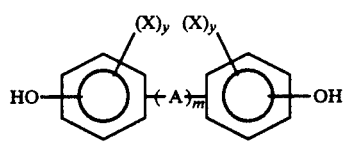

(VII)

wherein A is selected from the group consisting of a divalent hydrocarbon radical containing from 1 to about 15 carbon atoms; a halogen-substituted divalent hydrocarbon radical containing from 1 to about 15 carbon atoms and divalent groups such as:

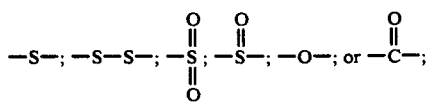

Each X in the Formula (VII) is independently selected from the group consisting of halogen, hydrocarbyl such as an alkyl group of from 1 to about 8 carbon atoms; an aryl group of from 6–18 carbon atoms, an aralkyl group of from 7 to about 14 carbon atoms, an oxyalkyl group of from 1 to about 8 carbon atoms, and an oxyaryl group of from 6 to 19 carbon atoms; and wherein m is zero or 1 and y is a whole number integer of from 0 to 4, inclusive.

Typical of some of the dihydric phenols (VII) that are advantageously employed are bis-phenols such as bis(4-hydroxyphenyl) methane, 2,2'-bis-(4-hydroxy-3-methylphenyl)propane, 4,4'-bis(4-hydroxyphenyl)-heptane, 2,2'-bis(4-hydroxy-3,5-dichlorophenyl)propane, 2,2'-bis(4-hydroxy-3,5-dibromophenyl)propane; dihydric phenol ethers such as bis(4-hydroxphenyl)ether, bis(3,5-dichloro-4-hydroxyphenyl)ether; dihydroxydiphenols such as 3,3'-dichloro-4,4'-dihydorxybiphenyl; dihydroxyaryl sulfones such as bis(4-hydroxyphenyl) sulfone, bis(3,5-dimethyl-4-hydroxyphenyl)sulfone; dihydroxybenzenes, such as resorcinol and hydroquinone; halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)-sulfide and bis(4-hydroxyphenyl) sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols (VII) or a combination of a dihydric phenol (VII) with glycol.

Preferred dihydric phenols of Formula (VII) are the 4,4'-bisphenols.

Those polycarbonate resins used as cross-linker agents in the process of the invention, wherein dihydric phenols of the formula (VII) are secondary reactants in their preparation, will of course contain polymer chain units of the formula (VI) given above, but wherein D represents a divalent aromatic radical of the dihydric phenol (VII).

The term "polycarbonate" as used herein is also inclusive of copolyester-polycarbonates, i.e.; resins which contain in addition to recurring polycarbonate chain units of Formula (VI) given above, wherein D represents the divalent aromatic radical of the dihydric phenol (III) and optionally of the dihydric phenol (VII), repeating or recurring carboxylate units, for example of formula:

(VIII)

wherein $R^3$ is a divalent hydrocarbylene group such as an alkylene, alkylidene, or cycloalkylene group; an alkylene, alkylidene or cycloalkylene group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like, The copolyester-carbonate branching agent resins used in the method of the invention include some which are generally well known; see for example the U.S. Pat. No. 4,788,274 (Rosenquist) incorporated herein by reference thereto. In general, they are prepared as described above for the preparation of polycarbonate branching agents, but by the added presence of a difunctional carboxylic acid (ester precursor) in the water immiscible solvent; see for example U.S. Pat. Nos. 3,169,121 and 4,487,896 incorporated herein by reference thereto.

In general, any difunctional carboxylic acid (dicarboxylic acid) conventionally used in the preparation of linear polyesters may be utilized in the preparation of the copolyester-carbonate resin branching agents of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

(IX)

wherein $R^3$ has the meaning previously ascribed to it.

Preferred difunctional carboxylic acids employed are the aromatic dicarboxylic acids. Particularly useful aromatic dicarboxylic acids are those represented by the general formula:

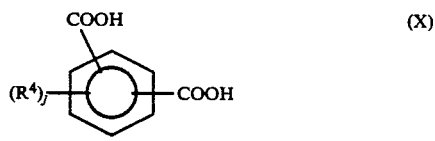
(X)

wherein j is a positive whole integer having a value of from 0 to 4 inclusive; and each $R^4$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difuntional carboxylic acids as well as individual carboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof. It should be understood then that the term "difunctional carboxylic acid" as used herein, includes the reactive derivatives.

The proportions of reactants employed to prepare the copolyester-carbonate resin branching agents of the invention will vary in accordance with the proposed use of the product resin. Those skilled in the art are aware of useful proportions, as described in the U.S.

patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are randomly branched polycarbonate branching resins wherein a minor amount [typically between 0.05 and 2 mole percent, based on the quantity of dihydric phenol (III) and (VII) used] of a polyfunctional aromatic compound is a co-reactant with the dihydric phenol (VII) in the reaction mixture, comprising also the carbonate precursor and optionally the ester precursor; to provide a thermoplastic randomly branched, branching agent polycarbonate. These polyfunctional aromatic compounds may be hydroxyl, carboxyl, carboxylic anhydride, haloformyl, or mixtures thereof. Some illustrative non-limiting example of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making randomly branched polycarbonates are disclosed in U.S. Pat. Nos. 3,635,895 and 4,001,184, both of which are incorporated herein by reference.

In the conventional polymerization methods of preparing polycarbonates, a molecular weight regulator (a chain stopper) is generally added to the reaction mixture prior to or during the contacting with a carbonate precursor. Useful molecular weight regulators include, but are not limited to, monohydricphenols such as phenol, chroman-I, paratertiarybutyl-phenol, p-cumyl-phenol and the like. Techniques for the control of molecular weight are well known in the art and used for controlling the molecular weight of the polycarbonate branching agent resins used in the present invention.

In accordance with the process of the invention, a branching resin as described above is homogeneously admixed with the linear polyester to be branched. Admixture may be carried out with the aid of conventional resin mixing apparatus, including but not limited to conventional resin extruders equipped to mix two different resin materials, dry mixers and the like. The solid resins may be pre-mixed before introduction into the extruder.

A branching proportion of the branching resin will depend upon the density of branches desired and the number of branch sites available. In general, from about 0.1 to 25 percent by weight of the linear polyester, will comprise a branching proportion of branching agent resin.

The thermoplastic molding resin compositions of the instant invention containing branching resins having units of the formula (I) may also be admixed with various commonly known and used additives such as, for example, antioxidants; antistatic agents; inert filler such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; flame retardants; and mold release agents.

The actual branching of the linear polyester resin is effected advantageously by a transesterification reaction. The transesterification reaction is promoted by heating the mixed reactant resins to a transesterification temperature (generally within the range of from about 100° to 300° C., preferably 200° to 250° C.).

A catalytic proportion of a transesterification catalyst may be present to promote the exchange. A catalytic proportion is generally one within the range of from about 0.00001 to 0.01 parts by weight of the resin composition. Useful transesterfication catalysts are basic catalysts conventionally employed in transesterification reactions. Representative of such catalysts are oxides, hydrides, hydroxides or amides of alkali or alkaline earth metals such as, for example, lithium hydroxide and the like. Also, basic metal oxides such as zinc oxide, and the like. Also representative of transesterification catalysts are salts of weak acids such as lithium stearate; organotin catalysts such as dibutyltin oxide; aluminum or boron anion containing catalysts such as those described in U.S. Pat. Nos. 4,330,669 and 4,395,062 and the like. One or more catalysts may be used in combination.

Although the invention is not to be bound by any theory of operation, it is believed that during the transesterification reactions, the R groups are displaced by catalyst activated polymer end groups to yield new polymer branch sites.

The following examples and preparations describe the manner and process of making and using the invention and set forth the best mode contemplated by the inventor of carrying out the invention but are not to be construed as limiting the invention. Where reported, the following tests were carried out:

Intrinsic Viscosity (IV)

The intrinsic viscosity of polycarbonates was measured at a temperature of 25° C. in methylene chloride and is reported in deciliters/gram (dl/g).

Preparation 1

Preparation of 1/1 copolycarbonate of bisphenol-A (BPA) and methyl-2, 4-dihydroxybenzoate.

A 2000 ml four neck flask was fitted with a mechanical stirrer, a pH probe, an aqueous caustic inlet tube and a Claisen adaptor to which was attached a dry ice condenser and a gas inlet tube. To the flask was added 700 ml methylene chloride, 200 ml water, 8.4 ml (0.06 mole) triethylamine, 57 g (0.25 mole) bisphenol-A and 42 g (0.25 mole) of methyl-2, 4-dihydroxybenzoate. With stirring, the pH was raised to 9 to 10 by addition of 25% aqueous sodium hydroxide, then phosgene was introduced into the flask at 1.5 g/min for 50 minutes, at which time an additional 350 ml of water and 150 ml of methylene chloride were added. Phosgene addition was then continued for an additional 5 min (82.5 g, 0.83 mole total phosgene) at which time the reaction mixture had become too viscous to stir. After addition of 300 ml more of methylene chloride, the resins layer was separated from the brine layer, washed with 3 wt. % aqueous HCl, then twice with distilled water. The resins layer was then dried over silica gel, filtered, then precipitated into two volumes of methanol in a Waring blender, washed with additional methanol and dried. The resin was found to have an intrinsic viscosity of 0.672 dl/g in methylene chloride (25° C.). The resin had a PMR spectrum consistent with the assigned structure.

Preparation 2

Preparation of homopolycarbonate of methyl-2,4-dihydroxybenzoate. To the apparatus as described above in Preparation 1, supra. was added 350 ml methylene chloride, 100 ml water and 42 g (0.25 mole) of methyl-2,4-dihydroxybenzoate. With stirring, phosgene was introduced into the flask at a rate of 1.5 g/min for 30 mins (45 g, 0.45 mole) with the pH maintained at 2.5 to 4 by the addition of 25% aqueous sodium hydroxide. 6.0 ml (0.043 mole) triethylamine was then added dropwise to the flask and the pH then raised gradually to 9. Heat was evolved and the resin solution became very viscous. Phosgene was then introduced for an additional 12 minutes at 1 g/min (12 g.; 0.12 mole) at pH 8.5 to 9, with simultaneous addition of 300 ml additional methylene chloride. The resin layer was then separated from the brine layer, washed with 3% aqueous HCl, then twice with distilled water. The resin layer was then dried over magnesium sulfate, filtered, precipitated into two volumes of methanol in a Waring blender, washed with additional methanol and dried. The resin was found to have an intrinsic viscosity of 0.551 in methylene chloride at 25° C. The resin had a PMR spectrum consistent with the assigned structure.

EXAMPLE 1

290 g of poly(butylene) terephthalate (Valox ® 315 resin, General Electric Co.), 10.9 g (2.0 mole %) of the 1/1 copolycarbonate of bisphenol-A and methyl-2,4-dihydroxybenzoate (IV=0.672 dl/g) prepared according to Preparation 1., supra. and 0.4 g (0.0014 mole %) of a lithium stearate catalyst concentrate (prepared by extruding 13.6 g lithium stearate into 980 g Valox ® 315, supra., and 20 g Lexan ® 145, a polycarbonate resin available from the General Electric Co.) were blended together, extruded and pelletized, using a ¾" diameter Brabender single screw extruder set at 250° C. Residence time in the extruder was estimated to be one minute. A portion of the extruded pellets were dried and re-extruded. Melt viscosities at 250° C. were determined, with the initial Valox ® 315 sample, the once extruded and twice extruded samples exhibiting melt viscosities of 8070 poise, 30,700 poise and 32,100 poise, respectively, determined by the procedure of test ASTM D1238, condition T with 0.042 inch orifice, 21500 g weights and at 250° C.

EXAMPLE 2

1200 g of Valox ® 315 resin, supra., 10.6 g (1.0 mole %) of a homopolycarbonate of methyl-2,4-dihydroxybenzoate (prepared according to the procedure of Preparation 2,supra. and 1.66 g (0.0014 mole %) of the lithium stearate catalyst concentrate (described above In Example 1, supra.) were blended together, extruded and pellitized using a 1¾" diameter sterling single screw extruder set at 260° C. Residence time in the extruder was estimated to be one minute.

The extrusion was then repeated using 21.2 g (2 mole %) of the homopolycarbonate. Melt viscosities at 250° C. were determined as described in Example 1, supra. with the initial Valox ® 315 sample, the 1 mole % and the 2 mole % samples exhibiting 7880 poise, 14,900 poise and 33,700 poise, respectively.

Samples of the three materials were then injection molded at 250° C. into 25 mm diameter, 2.5 mm thick disks. Full rheology characterization of these samples was then carried out on a Rheometrics Corp. Model RDS7700 dymanic spectrometer. Testing was at 240° C., at 20% strain and with 2.0 mm gap and 12.5 mm radius sample geometry. Initial time sweep testing showed the samples to be stable under the test conditions. Results of frequency sweep studies are given in Table I, below.

TABLE I

Viscosity Characterization of Polybutylene Terephthalate co-reacted with Ester Side Group (ESG) Polycarbonate Resin

| Resin Composition | $\eta$ (poise $\times 10^{-3}$)① | | | G' (dyme/cm$^2$ $\times 10^{-3}$)② | | | G" (dyme/cm$^2$ $\times 10^{-3}$)③ | | |
|---|---|---|---|---|---|---|---|---|---|
| | 1 rad/s④ | 10 rad/s | 100 rad/s | 1 rad/s | 10 rad/s | 100 rad/s | 1 rad/s | 10 rad/s | 100 rad/s |
| Valox ® 315-control | 12.4 | 11.8 | 8.82 | 0.527 | 12.3 | 311.0 | 12.4 | 117.0 | 826.0 |
| Valox ® 315/1.0 mole % ESG Homopolymer | 36.8 | 31.1 | 15.2 | 2.77 | 71.9 | 781.0 | 36.7 | 302.0 | 1300.0 |
| Valox ® 315/2.0 mole % ESG Homopolymer | 147.0 | 81.8 | 28.8 | 53.0 | 403.0 | 1980.0 | 137.0 | 711.0 | 2090.0 |

①Complex Viscosity
②Elastic Modulus
③Viscous Modulus
④Frequency (empirically equivalent to shear rate)

EXAMPLE 3

Torque Experiment Procedure: Torque experiments were carried on a System 90 torque rheometer manufactured by the Haake Buchler Instruments Co., Experiments were run at 50 rpm and 250° C. set temperature (250° to 260° C. actual temperature). 56.9 g samples of a poly(butylene)terephthalate (Valox ® 315 grade, General Electric Co.; containing 100 ppm of titanium, the residue of the tetralkyl-titanate used in its manufacture) were placed in the apparatus, and the sample mixed for three minutes, to allow temperature and torque to stabilize. The ester side group polycarbonate branching resin and transesterification catalyst were then added, and the sample allowed to mix for an additional 17 minutes, with torque and temperature continuously monitored. Using this procedure, the Preparations 1 and 2 above were tested. The test results are given in Table II, below.

TABLE II

Co-reaction of Polybutylene Terephthalate with the Ester Side Group (ESG) Polycarbonate Resin in the Haake Torque Rheometer

| Composition | Polycarbonate Resin Level[1] (mole %) | Lithium Stearate (mole %)[2] | Initial[3] | Torque (Meter/grams) Maximum (time) | Final |
|---|---|---|---|---|---|
| —[4] | — | — | 482 | none | 285 |
| —[5] | — | 0.001% | 497 | none | 280 |
| Lexan ® 145 resin[6] | 2.1 g (0%) | 0.001% | 528 | none | 280 |
| 1/1 ESG Co-Polymer[7] | 2.1 g (2%) | — | 468 | none | 333 |
| 1/1 ESG Co-Polymer | 2.1 g (2%) | 0.05% | 442 | 1077 (5.6) | 630 |
| 1/1 ESG Co-Polymer | 2.1 g (2%) | 0.025% | 494 | 1072 (5.2) | 656 |
| 1/1 ESG Co-Polymer | 2.1 g (2%) | 0.002% | 456 | 1202 (9.2) | 865 |
| 1/1 ESG Co-Polymer | 2.1 g (2%) | 0.001% | 477 | 1260 (7.6) | 788 |
| ESG Homopolymer[8] | 1.0 g (2%) | 0.002% | 473 | 1086 (9.6) | 758 |
| ESG Homopolymer | 1.0 g (2%) | 0.001% | 479 | 1186 (8.2) | 760 |
| ESG Homopolymer | 1.0 g (2%) | 0.0005% | 468 | 1124 (5.0) | 697 |

[1]Grams and mole % ester side groups (i.e. moles ester side group repeat units/moles of PBT repeat units × 100) added to 56.9 g PBT resin, unless noted.
[2]Mole % lithium stearate is moles lithium stearate/mole PBT repeat units × 100.
[3]Initial Torque at 3 mins, before addition of polycarbonate resin or catalyst, final Torque at 20 mins, after 17 min for resin co-reaction, and maximum torque, with time in minutes of the maximum.
[4]Control, 59. g Valox ® 315 only
[5]Control, 59 g of Valox ® 315 and catalyst
[6]Control, Valox ® 315, catalyst and standard BPA polycarbonate homopolymer, (General Electric Co.), with IV = 0.500 dl/g
[7]1/1 co-polycarbonate of BPA and methyl-2,4-dihydroxybenzoate with IV = 0.672 dl/g (Preparation 1.).
[8]Homopolycarbonate of methyl-2,4-dihydroxybenzoate with IV = 0.551 dl/g (Preparation 2.).

What is claimed is:

1. A process for branching a thermoplastic, linear, polyester resin, which comprises;
   providing said resin;
   homogeneously mixing with the resin, a branching proportion of a thermoplastic, polymeric, branching resin having recurring polymer chain units selected from those of the formula:

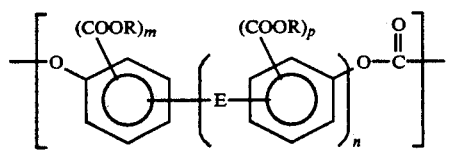

(I)

wherein m, n and p are each independent integers of 0 or 1; R represents hydrocarbyl; and E represents alkylene containing from 1 to 15 carbon atoms, inclusive, halogen—substituted alkylene of 1 to 15 carbon atoms, inclusive, alkylene of 1 to 15 carbon atoms, inclusive, substituted with a—COOR group where R is as previously defined, or alkylene having 1 to 15 carbon atoms substituted with a monovalent group of the formula:

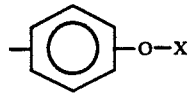

wherein X represents one of hydrogen, hydrocarbyl or

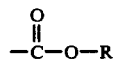

wherein R is as defined above;
provided there is at least one moiety present, containing an R group; and
effecting a branching transesterification reaction of the linear polyester resin with the branching resin.

2. The process of claim 1 wherein m is 1 and n is 0.
3. The process of claim 2 wherein R represents alkyl.
4. The process of claim 1 wherein m, n and p are each 1.
5. The process of claim 4 wherein E represents alkylene and R is alkyl.
6. The process of claim 4 wherein m and p are each 0; n is 1; E represents alkylene substituted with a—COOR group and R is alkyl.
7. The process of claim 1 wherein the linear polyester resin has repeating chain units of the formula:

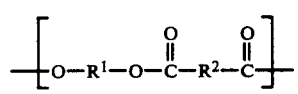

(II)

wherein each of $R^1$ and $R^2$ is a divalent aliphatic, alicyclic or aromatic radical containing 2 to 10 carbon atoms.

8. The process of claim 1 wherein the reaction is promoted with a catalyst.
9. The branched product of claim 1.

* * * * *